(12) United States Patent
Walsh (10) Patent No.: US 6,492,044 B1
(45) Date of Patent: Dec. 10, 2002

(54) REACTANT CONDITIONING FOR HIGH TEMPERATURE FUEL CELLS

(75) Inventor: Michael M. Walsh, Fairfield, CT (US)

(73) Assignee: Plug Power Inc., Latham, NY (US)

( * ) Notice: Subject to any disclaimer, the term of this patent is extended or adjusted under 35 U.S.C. 154(b) by 166 days.

(21) Appl. No.: 09/606,561

(22) Filed: Jun. 29, 2000

(51) Int. Cl.$^7$ ................................................. H01M 8/00
(52) U.S. Cl. ............................... 429/13; 429/30; 429/46
(58) Field of Search ............................... 429/13, 30, 46

(56) References Cited

U.S. PATENT DOCUMENTS

| | | | |
|---|---|---|---|
| 5,599,639 A | 2/1997 | Sansone et al. | ............... 429/33 |
| 5,660,048 A | 8/1997 | Belding et al. | ................ 62/94 |
| 5,902,876 A | * 5/1999 | Murata et al. | ............... 528/125 |
| 5,945,233 A | 8/1999 | Onorato et al. | ............... 429/33 |
| 6,299,996 B1 | * 10/2001 | White et al. | .................. 429/19 |

OTHER PUBLICATIONS

Sorbent Systems. Com, Interenet Information "Desiccant Types".
Samms, et al. "Thermal Stability of Proton Conducting Acid Doped Polybenzimidazole (PBI) is Simulated Fuel Cell Environments", *Journal of the Electrochemical Society*, May 15, 1995 (pp. 1–19).
Sorbentsystems.com, Internet Information.*

* cited by examiner

Primary Examiner—Carol Chaney
Assistant Examiner—Dah-Wei D. Yuan
(74) Attorney, Agent, or Firm—Fish & Richardson P.C.

(57) ABSTRACT

A fuel cell system having one or more desiccants is disclosed. The desiccant is capable of sorbing water vapor present in the fuel cell system to reduce the amount of water that sorbs to a liquid water-sensitive electrolyte.

11 Claims, 8 Drawing Sheets

REACTANT CONDITIONING FOR HIGH TEMPERATURE FUEL CELLS

BACKGROUND

The invention relates to fuel cell desiccants.

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a polymer exchange membrane, also more generally referred to as a proton exchange membrane, both references commonly abbreviated "PEM") between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons formed at the anode side of the membrane electrode assembly represent oxidation of the anode gas during the fuel cell reaction. Electron consumption at the cathode side of the membrane electrode assembly represents reduction of the cathode gas during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \quad (1)$$

$$\tfrac{1}{2}O_2 + 2H^+ + 2e^- \rightarrow H_2O \quad (2)$$

$$H_2 + \tfrac{1}{2}O_2 \rightarrow H_2O \quad (3)$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

PEM fuel cell membranes have been made from perfluorosulfonic acid polymers such as NAFION™. It can be advantageous to hydrate such membranes to maintain performance. As a result, it is common for the maximum operating temperature for such membranes to be less than 100° C. (e.g., about 80° C.) at atmospheric pressure. At such conditions, another problem may arise in fuel cell systems where the hydrogen fuel stream is derived from a processed hydrocarbon such as natural gas or methanol, in that carbon monoxide may be present as a by-product of the fuel conversion process, and carbon monoxide can poison most fuel cell catalysts (e.g., platinum based) at temperatures of about 100° C. or lower. Therefore, it can be desirable to provide a higher temperature, CO tolerant fuel cell system.

Acid-doped polybenzimidazole (PBI) membranes have been developed that may be operated at temperatures above 100° C., for example 150–200° C. Such membranes are disclosed, for example, in U.S. Pat. Nos. 5,525,436, 5,599, 639, and 5,945,233, which are hereby incorporated by reference in their entirety. In such membranes, a PBI film is typically synthesized and then doped with a strong acid such as phosphoric acid or sulfuric acid to produce a polymer with the acid anion bound to the protonated PBI.

SUMMARY

This invention relates in part to the discovery that high temperature acid-doped fuel cell membranes can be damaged if water is allowed to condense onto such membranes as they are cooled. For example, while the relative humidity of fuel cell reactants in a "high temperature" PEM fuel cell operating at temperatures above 100° C. (e.g., 150–200° C.) may be low, the dew point of such a mixture may be such that liquid water will condense onto the membranes in the fuel cell stack when the stack is cooled from its operating temperature.

As previously discussed, some solid electrolytes are formed of PBI that is doped with phosphoric acid. The phosphoric acid is added to the PBI to enhance the proton conducting properties of the electrolyte. In general, the interaction of water vapor with the PBI electrolyte during operation of the fuel cell or system does not leach the phosphoric acid from the PBI electrolyte. However, when exposed to liquid water (e.g., condensed water vapor formed upon cooling of a fuel cell or fuel cell system after shut down), the liquid water can leach the phosphoric acid from the electrolyte, rendering the electrolyte less useful (e.g., by decreasing the ability of the PBI electrolyte to conduct protons).

Under certain embodiments of the present invention, a desiccant system is provided to prevent water condensation in high temperature PEM fuel cells. A desiccant can be placed in the fuel cell or system so that, after shut down, water (e.g., condensed water vapor) can sorb to the desiccant as the fuel cell or system cools. Furthermore, because fuel cells and fuel cell systems typically operate at temperatures greater than about 100° C., water sorbed on the desiccant can be desorbed during operation of the fuel cell or system, allowing the desiccant to be regenerated for re-use in the fuel cell or system. Thus, a fuel cell or a fuel cell system containing a water-sensitive solid electrolyte and a desiccant can demonstrate a relatively long useful life and/or relatively good performance. The fuel cell or the fuel cell system can be simple and/or inexpensive to make.

Generally, the desiccant has a higher water sorption capacity at room temperature than at the operating temperature of a fuel cell or fuel cell system (e.g., greater than about 100° C.). The desiccant can be formed of, for example, molecular sieves, silica gels and/or clays. In some embodiments, the desiccant is formed of granules (e.g., granules in a water-permeable container). In certain embodiments, the desiccant is in the form of a compressed block. The desiccant can be in the form of a coating (e.g., a coating on a portion of the fuel cell or fuel cell system that is exposed to water vapor, such as a manifold or a channel in a flow field plate). More than one desiccant can be used.

In one aspect, the invention features a method of managing water in a fuel cell having a solid PBI electrolyte. The method includes operating the fuel cell at a temperature above about 100° C., shutting down the fuel cell so that the fuel cell cools, and contacting a reactant gas with a desiccant disposed within the fuel cell. The desiccant has a higher water sorption capacity at room temperature than at 100° C. so that water present in the reactant gas sorbs to the desiccant as the fuel cell cools.

The method can further include, after shutting down the fuel cell (e.g., cooling to less than about 100° C.), operating the fuel cell at a temperature above about 100° C. so that water sorbed to the desiccant desorbs from the desiccant. Optionally, after shutting down the fuel cell, the fuel cell can be valved off so that gases cannot flow through the fuel cell. In some embodiments, the reactant gas may contact the desiccant as the reactant gas flows through the fuel cell in a reactant gas stream. In still other embodiments, reactants may be circulated across the desiccant as the fuel cell or system cools.

In another aspect, the invention features a fuel cell stack that includes at least two fuel cells, a manifold and a desiccant disposed in the manifold. One fuel cell includes two flow field plates and a solid PBI electrolyte between the flow field plates. The other fuel cell includes two flow field plates and a solid electrolyte therebetween. Each flow field plate has an inlet in fluid communication with its respective outlet. The inlet and outlet of one of the flow field plates in one fuel cell are in fluid communication with the inlet and outlet, respectively, of one of the flow field plates in the other fuel cell. Likewise, the inlets and outlets, respectively, of the other two flow field plates in the fuel cell stack are in fluid communication. The manifold is in fluid communication with the inlet of one of the flow field plates from each fuel cell. The desiccant is capable of sorbing water vapor present in the fuel cell stack to reduce the amount of water that sorbs to the solid PBI electrolyte.

The fuel cell stack can include one or more additional manifolds in fluid communication with the inlet and/or outlet of one or more of the flow field plates. One or more additional desiccant(s), formed of the same or different material(s), can be disposed in the additional manifold(s).

In a further aspect, the invention features a fuel cell system that includes a fuel cell having two flow field plates, a solid PBI electrolyte disposed between the flow field plates, an inlet line, and outlet line, two valves and a desiccant. The inlet and outlet lines are in fluid communication with the inlet and outlet, respectively, of one of the flow field plates. One valve is disposed along the inlet line and is capable of restricting gas flow through the inlet line. The other valve is disposed along the outlet line and is capable of restricting gas flow through the outlet line. The desiccant is disposed inside the fuel cell system between the valves.

In some embodiments, the desiccant is in the inlet and/or outlet line (e.g., the cathode gas inlet line, the cathode gas outlet line, the anode gas inlet line and/or the anode gas outlet line).

In certain embodiments, the desiccant is coated on a portion of the fuel cell system (e.g., an inlet line, an outlet line, a manifold, and/or one or more channels of one or more flow field plates).

In another aspect, the invention features a fuel cell that includes two flow field plates, a solid PBI electrolyte between the flow field plates, and a desiccant on a portion of one of the flow field plates. The desiccant is capable of sorbing water vapor present in the fuel cell to reduce the amount of water that sorbs to the solid PBI electrolyte.

The desiccant can be coated on one or both of the flow field plates (e.g., on one or more channels of the flow field plate(s)).

Other features, objects, and advantages of the invention will be apparent from the description, drawings and claims.

DETAILED DESCRIPTION

Figure 1:
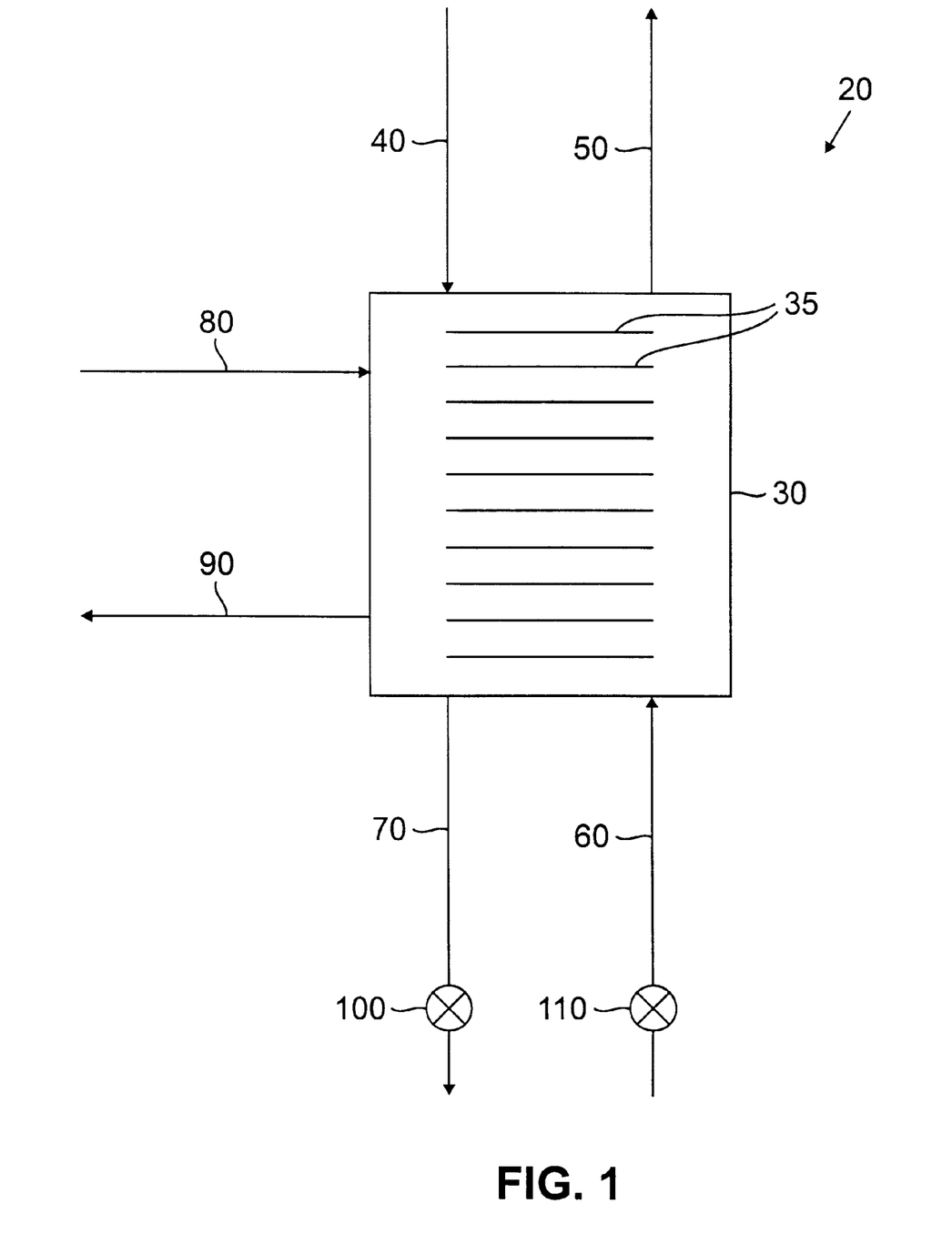
FIG. 1 is a schematic diagram of an embodiment of a fuel cell system.

FIG. 1 shows a fuel cell system 20 that includes a fuel cell stack 30 having a plurality of fuel cells 35, an anode gas inlet line 40, an anode gas outlet line 50, a cathode gas inlet line 60, a cathode gas outlet line 70, a coolant inlet line 80, and a coolant outlet line 90. Each of fuel cells 35 includes a solid electrolyte (e.g., membrane) formed of a material (e.g., PBI) that is susceptible to damage when exposed to water (e.g., liquid water, such as condensed water vapor formed during cooling of system 20 subsequent to shut down of system 20). Fuel cell system 20 further includes valves 100 and 110 located along inlet and outlet lines 60 and 70, respectively, so that valves 100 and 110 can control the flow of a cathode gas through 60 and 70.

Figure 2:
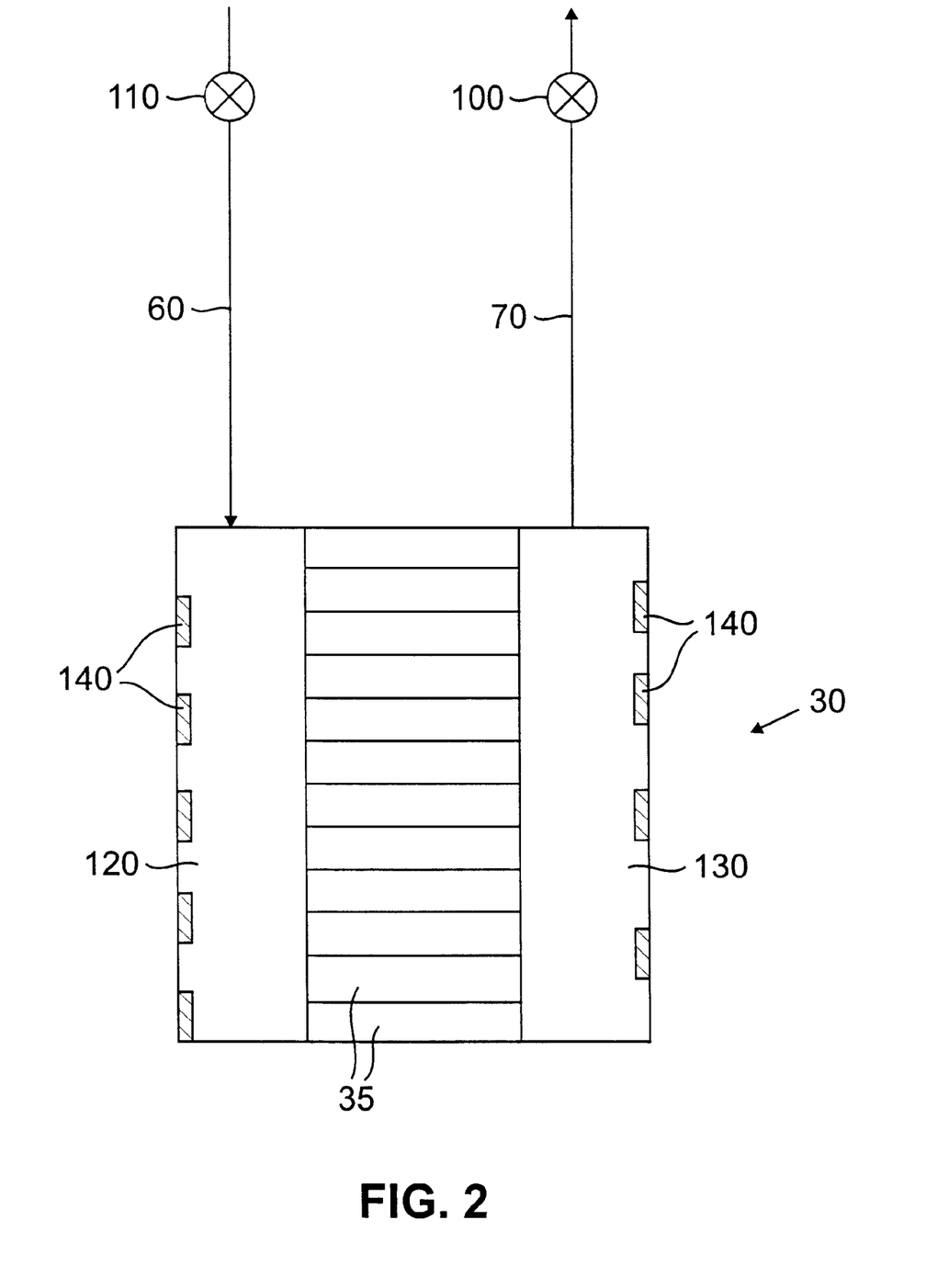
FIG. 2 is a schematic diagram of an embodiment of a fuel cell stack having a desiccant.

FIG. 2 shows a portion of fuel cell stack 30 that includes a cathode gas inlet manifold 120, a cathode gas outlet manifold 130, and a desiccant 140 in manifolds 120 and 130. During operation, the cathode gas flows along inlet line 60 to manifold 120, through fuel cells 35, and to manifold 130. The cathode gas then flows along line 70 where it can be, for example, vented to the atmosphere and/or recycled to be re-used by fuel cell system 20.

Valves 100 and 110 can be used to regulate the amount of cathode gas that flows through manifolds 120 and 130 and fuel cells 35. For example, during operation of system 20, valves 100 and 110 can be opened so that a desired amount of the cathode gas flows through fuel cells 35. Alternatively, when system 20 is shut down, valves 100 and 110 can be closed to reduce or prevent the flow of additional cathode gas through system 20. Closing valves 100 and 110 when system 20 is shut down also assists in reducing the amount of water that is introduced into system 20, thereby reducing the amount of water that interacts with the solid electrolyte present in fuel cells 35.

In general, desiccant 140 is formed of a material that can sorb and desorb water so that, as the cathode gas flows through manifolds 120 and 130, the cathode gas can interact with desiccant 140 and water (e.g., water vapor) can be transferred between desiccant 140 and the cathode gas. For example, if the cathode gas has a relatively high water content, water present in the cathode gas can be transferred to desiccant 140 (e.g., by desiccant 140 sorbing water from the cathode gas). Alternatively, if the cathode gas has a relatively low water content, water sorbed to desiccant 140 can be transferred to the cathode gas (e.g., by desorption of water from desiccant 140).

In some embodiments, desiccant 140 has a higher water sorption capacity at room temperature than at the operating temperature of a fuel cell or fuel cell system (e.g., greater than about 100° C.). For example, desiccant 140 can be formed of a material that readily sorbs water when at a temperature below about 100° C. and readily desorbs water when at a temperature above about 100° C. This can allow condensed water vapor formed after shut down of system 20 to sorb to desiccant 140 rather than interacting with the water-sensitive solid electrolyte present in fuel cells 35. It also allows water sorbed to desiccant 140 to desorb from desiccant 140 when system 20 is heated back up to its operating temperature, thereby regenerating desiccant 140. Thus, desiccant 140 can provide a simple and passive system for extending the lifetime of the solid electrolyte present in fuel cells 35.

Examples of materials from which desiccant 140 can be formed include molecular sieves, silica gels, clays, and blends of these materials. Such materials include, for example, X- or Y-type zeolites (available from Linde Division of UOP), silica gels (available from Davison Division of W.R. Grace), indicating silica gels (available from IMPAK Corp.), Montmorillonite clays (available from IMPAK Corp.), calcium oxide, and calcium sulfate. Other suitable materials for desiccant 140 are disclosed in U.S. Pat. No. 5,660,048, which is hereby incorporated by reference.

Figure 3:
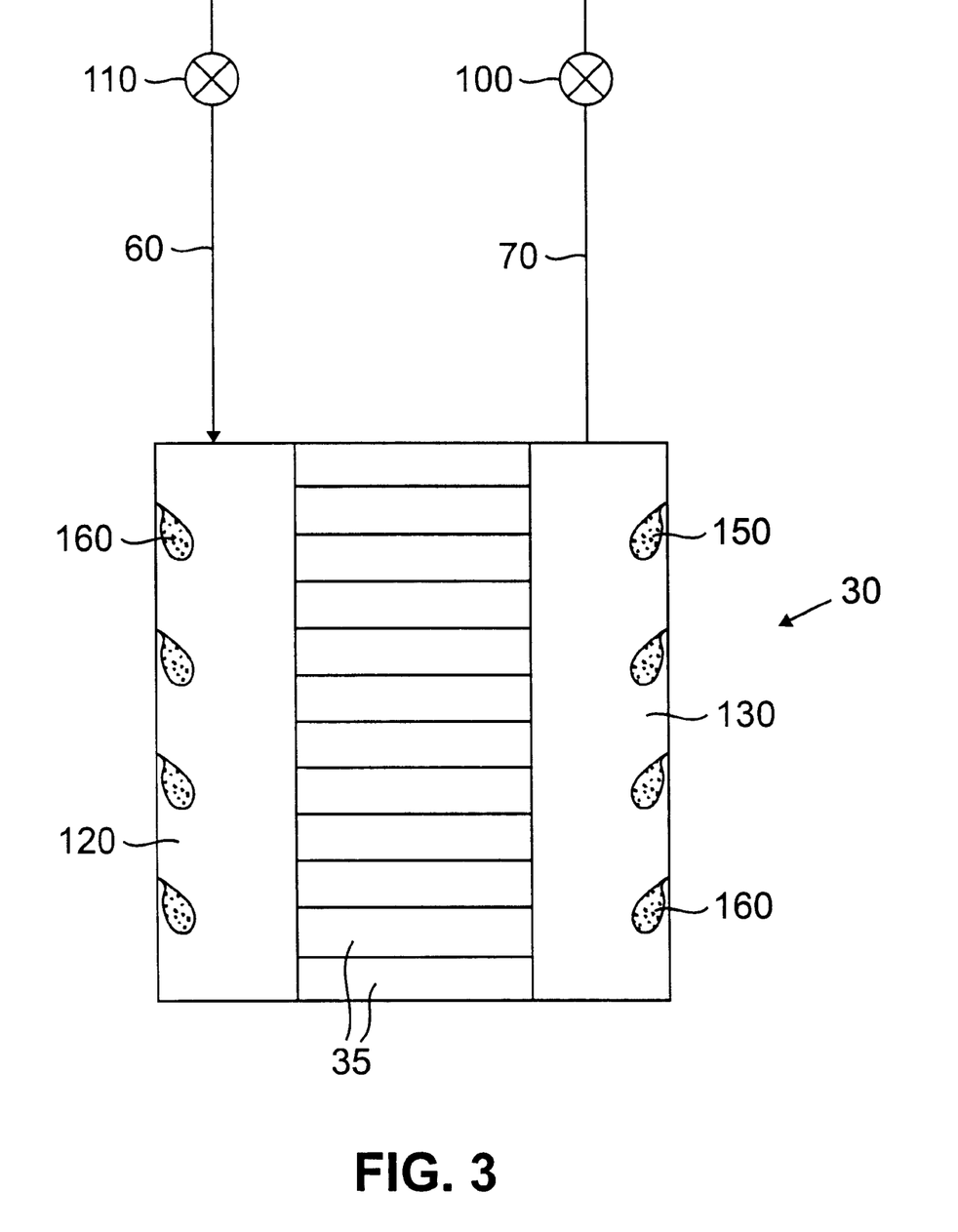
FIG. 3 is a schematic diagram of an embodiment of a fuel cell stack having a desiccant.

As shown in FIG. 2, desiccant 140 can be in the form of compressed blocks, which are placed in and/or attached to manifolds 120 and 130. FIG. 3 shows an alternate embodiment in which desiccant 140 is formed of granules (e.g., high surface area granules) placed in water vapor-permeable containers 160, e.g., a suitable plastic bag. Containers 160 can be placed in and/or attached to manifolds 120 and 130. In another embodiment, desiccant 140 can be coated on the walls of manifolds 120 and 130. This coating process can include forming a slurry, solution or suspension of the desiccant material, applying the slurry or suspension to the wall of manifolds 120 and 130, and then allowing the slurry or suspension to dry. Alternatively or additionally, the coating process can include pressing the desiccant onto the walls of manifolds 120 and 130 (e.g., by the use of heat and/or pressure). Combinations of these embodiments and methods can also be used. Moreover, while FIGS. 2 and 3 show desiccant 140 being present in manifolds 120 and 130, in some embodiments, desiccant 140 is present in either manifold 120 or 130. It will be appreciated that desiccant coatings in manifolds should be non-conductive or otherwise configured to avoid short-circuiting the fuel cells in the stack.

Figure 4:
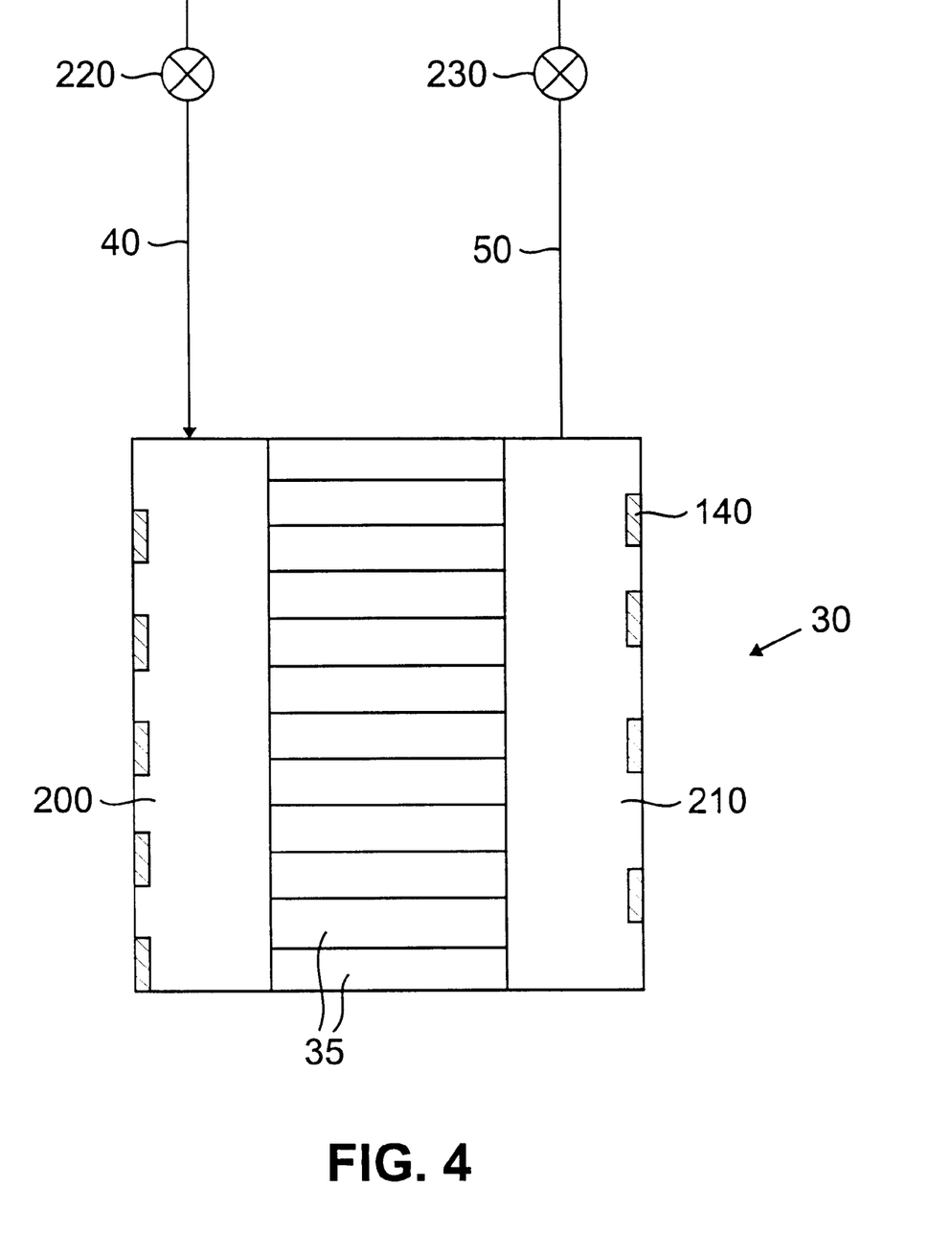
FIG. 4 is a schematic diagram of an embodiment of a fuel cell stack having a desiccant.

FIG. 4 shows an embodiment of fuel cell system 20 having an anode inlet manifold 200, an anode outlet manifold 210, valves 220 and 230, and desiccant 140 in manifolds 200 and 210. Valves 220 and 230 are located along lines 40 and 50, respectively, and can control the flow of gas through lines 40 and 50, respectively. During operation, the anode gas flows along inlet line 40 to manifold 200, through individual fuel cells 35, and to manifold 210. The anode gas then flows along line 50 and to, for example, an anode tailgas oxidizer. Desiccant 140 in anode manifolds 200 and 210 can be arranged within manifolds 200 and 210 as described above with respect to manifolds 120 and 130. Although shown in FIG. 4 as being present in both manifolds 200 and 210, in some embodiments, desiccant 140 can be present in manifold 200 or 210.

While certain arrangements of desiccant 140 in system 20 have been described, other arrangements can also be used. Generally, desiccant 140 is disposed within fuel cell system 20 at a location that is in fluid communication with one or more reactant gases, and, in certain embodiments, also in fluid communication with one or more of the solid electrolytes present in fuel cells 35. For example, desiccant 140 can be disposed manifold 120, 130, 200 and/or 210 in (e.g., in the form of granules, granules in a water-permeable container, a pressed block and/or a coating). Alternatively or additionally, desiccant 140 can be placed in anode gas inlet 40, anode gas outlet line 50, cathode gas inlet line 60, and/or cathode gas outlet line 70. In yet another embodiment, desiccant 140 could be associated with a gas diffusion layer in a fuel cell, such as the desiccant 140 being dispersed in the GDL material or being present in a discrete layer next to the GDL.

As noted above, desiccant 140 can be particularly advantageous when one or more of fuel cells 35 contain a solid electrolyte (e.g., a membrane) formed of a water sensitive material (e.g., PBI) because desiccant 140 can sorb water present in system 20 (e.g., condensed water formed as system 20 cools down after system 20 is shut down) so that the amount of liquid water that interacts with the solid electrolyte is reduced. This can, for example, reduce the amount of chemical substituents leached from the solid electrolyte by interaction of the solid electrolyte with liquid water (e.g., reduce the amount of phosphoric acid leached from a phosphoric acid doped solid PBI electrolyte).

Figure 5:
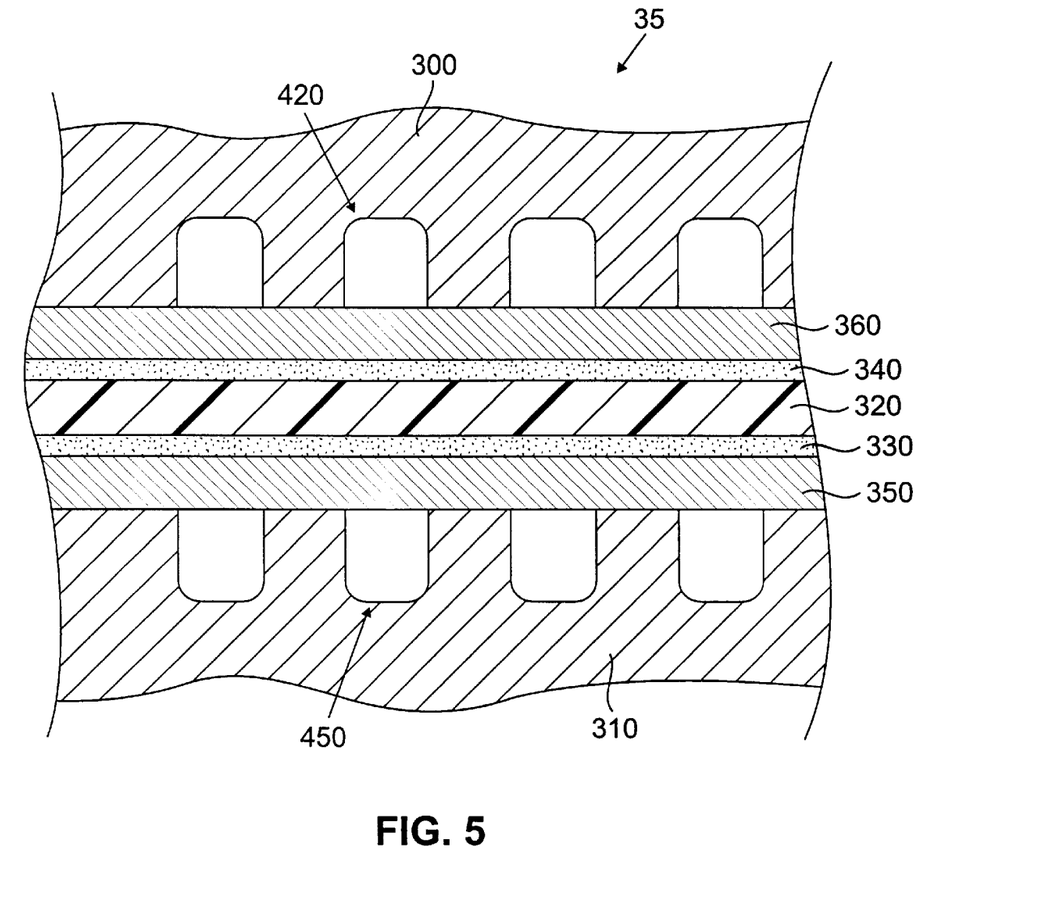
FIG. 5 is a cross-sectional view of an embodiment of a fuel cell.

FIG. 5 shows a partial cross-section of fuel cell 35 that includes a cathode flow field plate 300, an anode flow field plate 310, a solid electrolyte 320, catalyst layers 330 and 340, and gas diffusion layers 350 and 360. Fuel cells 35 can be arranged by having the back surface of a cathode flow field plate of one fuel cell serve as the anode flow field plate in the next fuel cell. A plurality of coolant flow field plates can also be used in this arrangement.

Generally, solid electrolyte 320 is formed of a material capable of allowing ions to flow therethrough while providing a substantial resistance to the flow of electrons. In some embodiments, electrolyte 320 is a solid polymer (e.g., a solid polymer ion exchange membrane), such as a solid polymer proton exchange membrane (e.g., a PBI membrane doped with a strong acid, such as phosphoric acid). In a preferred embodiment, electrolyte 320 is formed of PBI (e.g., phosphoric acid doped PBI). Such membranes are commercially available, for example, from W. L. Gore & Associates (Elkton, Md.). Alternatively, electrolyte 320 can also be prepared according to, for example, Onorato et al., U.S. Pat. No. 5,945,233, and Sansone et al., U.S. Pat. No. 5,599,639, hereby incorporated by reference.

Catalyst layer 330 can be formed of a material capable of interacting with hydrogen to form protons and electrons. Examples of such materials include, for example, platinum, platinum alloys, and platinum dispersed on carbon black. Alternatively, a suspension is applied to the surfaces of gas diffusion layers (described below) that face solid electrolyte 320, and the suspension is then dried. Catalyst material (e.g., platinum) can be applied to electrolyte 320 using standard techniques. The method of preparing layer 330 may further include the use of pressure and temperature to achieve bonding.

Catalyst layer 340 can be formed of a material capable of interacting with oxygen, electrons and protons to form water. Examples of such materials include, for example, platinum, platinum alloys, and noble metals dispersed on carbon black. Catalyst layer 340 can be prepared as described above with respect to catalyst layer 330.

Gas diffusion layers 350 and 360 are electrically conductive so that electrons can flow from catalyst layer 330 to flow field plate 310 and from flow field plate 300 to catalyst layer 340. GDLs can be formed of a material that is both gas and liquid permeable (e.g., by infusing a porous carbon black cloth or paper with a slurry of carbon black followed by sintering with a polytetrafluoroethylene material) so that the anode gas (e.g., hydrogen) can pass therethrough.

Figure 6:
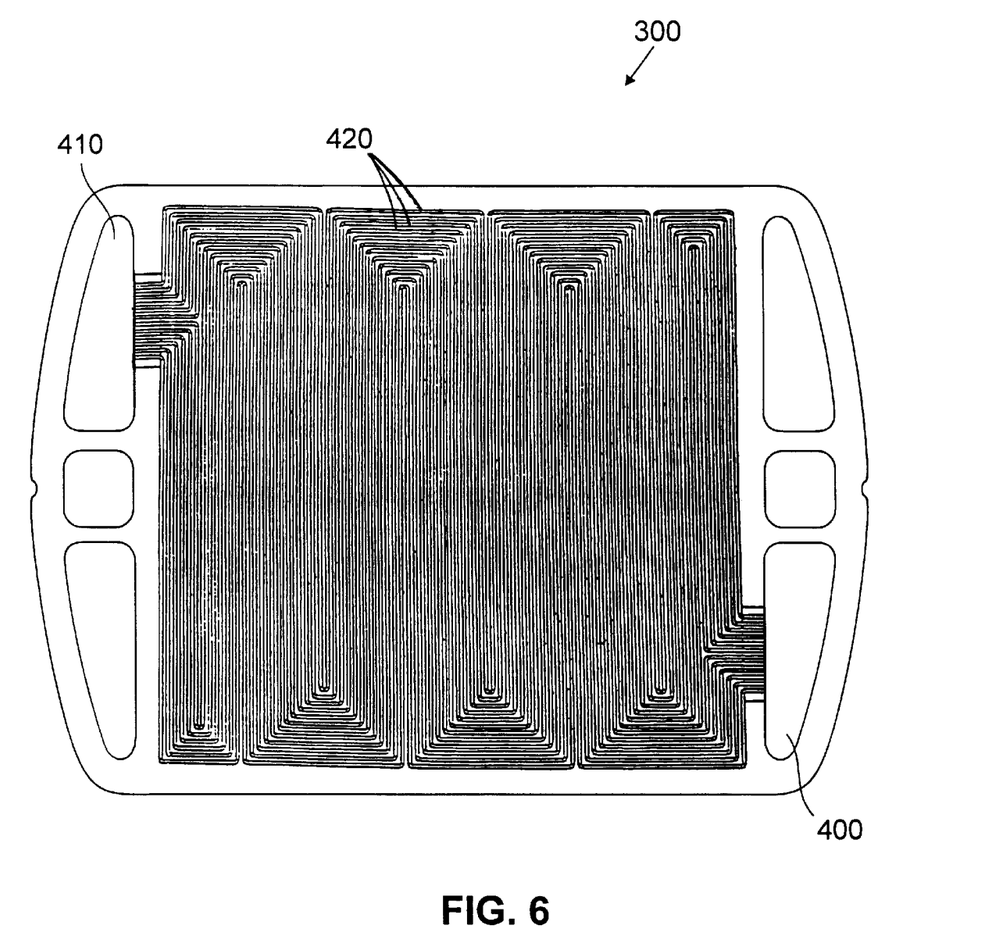
FIG. 6 is an elevational view of an embodiment of a cathode flow field plate.

FIG. 6 shows a cathode flow field plate 300 having an inlet 400, an outlet 410, and open-faced channels 420 that define a flow path for a cathode gas from inlet 400 to outlet 410. A cathode gas flows from cathode gas inlet line 70 and enters flow field plate 300 via inlet 400. The cathode gas then flows along channels 420 and exits flow field plate 300 via outlet 410. As the cathode gas flows along channels 420, oxygen contained in the cathode gas can permeate gas diffusion layer 360 and interact with catalyst layer 320. Electrons and protons present at layer 340 react with the oxygen to form water. The water can pass back through diffusion layer 360, enter the cathode gas stream in channels 420, and exit plate 300 through cathode flow field plate outlet 410.

Figure 7:
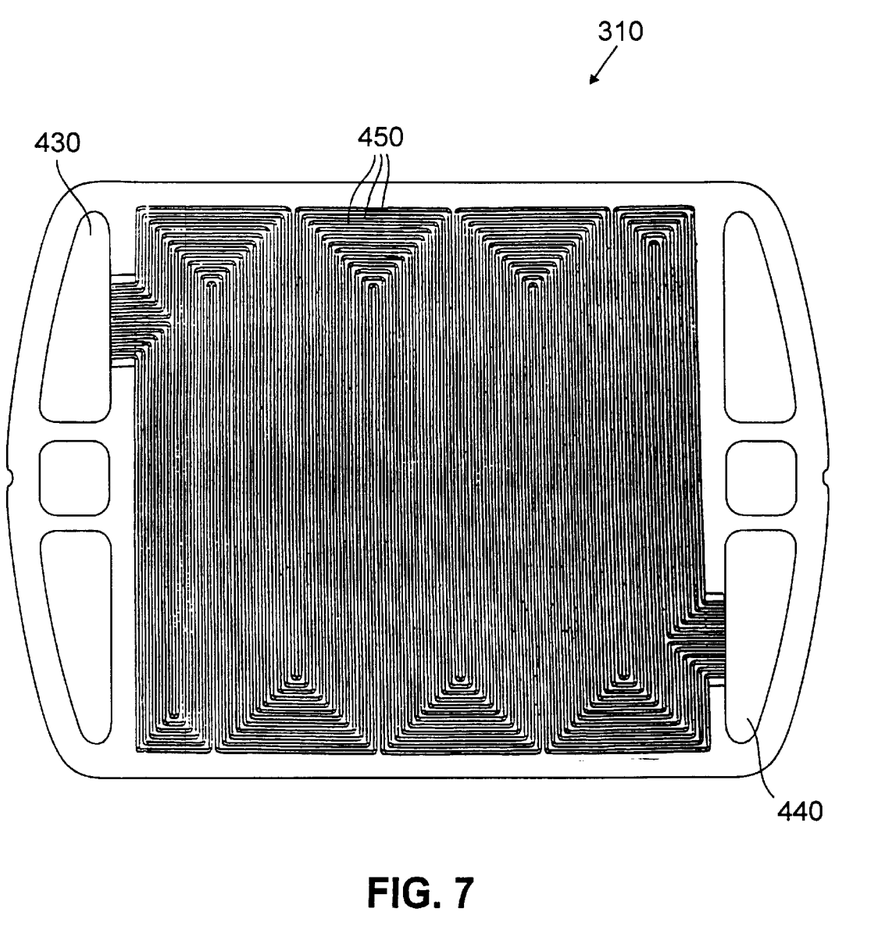
FIG. 7 is an elevational view of an embodiment of an anode flow field plate.

FIG. 7 shows an anode flow field plate 310 having an inlet 430, an outlet 440, and open-faced channels 450 that define a flow path for an anode gas from inlet 430 to outlet 440. An anode gas flows from the anode gas inlet line 40 and enters flow field plate 310 via inlet 430. The anode gas then flows along channels 450 and exits flow field plate 310 via outlet 440. As the anode gas flows along channels 450, hydrogen contained in the anode gas can permeate gas diffusion layer 350 and interact with catalyst layer 330 to form protons and electrons. The protons pass through solid electrolyte 320, and the electrons are conducted through gas diffusion layer 350 to anode flow field plate 310, ultimately flowing through an external load to cathode flow field plate 300.

Figure 8:
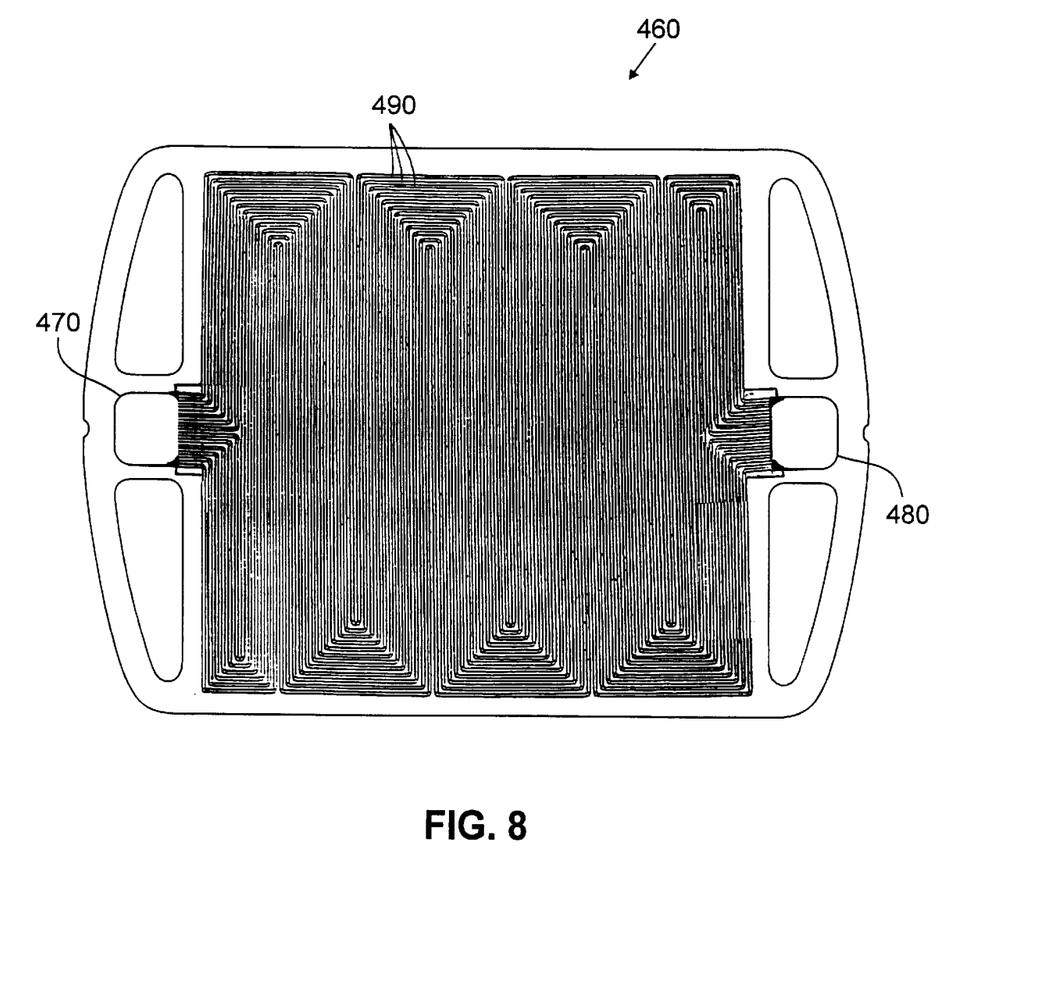
FIG. 8 is an elevational view of an embodiment of a coolant flow field plate.

Heat produced during the fuel cell reaction is removed from fuel cell 35 by flowing a coolant through fuel cell 35 via a coolant flow field plate. FIG. 8 shows a coolant flow field plate 460 having an inlet 470, an outlet 480 and open-faced channels 490 that define a flow path for coolant from inlet 470 to outlet 480. The coolant enters fuel cell 35 from coolant inlet line 80 via inlet 470, flows along channels 490 and absorbs heat, and exits fuel cell 35 via outlet 480 to coolant outlet line 90.

Fuel cells 35 are arranged within fuel cell stack 30 such that inlets 430 are configured to be in fluid communication with anode inlet manifold 200 and anode gas inlet line 40. Outlets 440 are configured to be in fluid communication with anode outlet manifold 210 and anode gas outlet line 50. Similarly, inlets 400 are configured to be in fluid communication with cathode inlet manifold 120 and cathode gas inlet line 70. Outlets 410 are configured to be in fluid communication with cathode outlet manifold 130 and cathode gas outlet line 60.

While certain embodiments of desiccant 140 have been described, other embodiments are possible. For example, desiccant 140 can be coated on channels 420 and/or 450. Furthermore, while the embodiments described above show desiccant 140 in manifolds 120, 130, 200 and 210, it should be recognized that desiccant 140 can be in any number or in any combination of these manifolds. Likewise, desiccant 140 can be located in any number or in any combination of manifolds, inlet lines, outlet lines, and/or channels.

In another embodiment, fuel cell system 20 can further include a blower located along inlets 40 and/or 60, and/or outlets 50 and/or 70. When fuel cell system 20 is shut down, the blower(s) can be activated to circulate gases in fuel cell stack and to contact the gases with desiccant 140.

Other embodiments are in the claims.

What is claimed is:

1. A fuel cell stack, comprising:
   a first fuel cell, comprising:
     a first flow field plate having an inlet and an outlet in fluid communication with the first flow field plate inlet;
     a second flow field plate having an inlet and an outlet in fluid communication with the second flow field plate outlet;
     a solid polybenzimidazole electrolyte between the first and second flow field plates;
   a second fuel cell, comprising:
     a third flow field plate having an inlet in fluid communication with the first flow field plate inlet and an outlet in fluid communication with the first flow field plate outlet, the third flow field plate outlet being in fluid communication with the third flow field plate inlet;
     a fourth flow field plate having an inlet in fluid communication with the second flow field plate inlet and an outlet in fluid communication with the second flow field plate outlet, the fourth flow field plate outlet being in fluid communication with the fourth flow field plate inlet;
     a second solid electrolyte between the third and fourth flow field plates;
   a first manifold in fluid communication with the first and third flow field plate inlets; and
   a first desiccant in the first manifold,
   wherein the first desiccant is capable of sorbing water vapor present in the fuel cell stack to reduce the amount of water that sorbs to the solid polybenzimidazole electrolyte.

2. The fuel cell stack of claim 1, further comprising:
   a second manifold in fluid communication with the first and third flow field plate outlets, the second manifold being different than the first manifold; and
   a second desiccant in the second manifold.

3. The fuel cell stack of claim 2, further comprising:
   a third manifold in fluid communication with the second and fourth flow field plate inlets, the third manifold being different than the first and second manifolds; and
   a third desiccant in the third manifold.

4. The fuel cell stack of claim 3, further comprising:
   a fourth manifold in fluid communication with the second and fourth flow field plate outlets, the fourth manifold being different than the first, second, and third manifolds; and
   a fourth desiccant in the fourth manifold.

5. The fuel cell stack of claim 1, further comprising:
   a second manifold in fluid communication with the second and fourth flow field plate inlets, the second manifold being different than the first manifold; and
   a second desiccant in the second manifold.

6. The fuel cell stack of claim 1, wherein the first desiccant is capable of desorbing water when the first desiccant is at a temperature above about 100° C.

7. The fuel cell stack of claim 1, wherein the first desiccant comprises a material selected from a group consisting of molecular sieves, silica gels, and clays.

8. The fuel cell stack of claim 1, wherein the first desiccant comprises granules.

9. The fuel cell stack of claim 8, wherein the granules are in a water vapor-permeable container.

10. The fuel cell stack of claim 1, wherein the first desiccant comprises a compressed block.

11. The fuel cell stack of claim 1, wherein the first desiccant is coated on the first manifold.

* * * * *